J. SWITYK.
CATTLE YOKE.
APPLICATION FILED MAR. 23, 1920.
1,346,278.
Patented July 13, 1920.
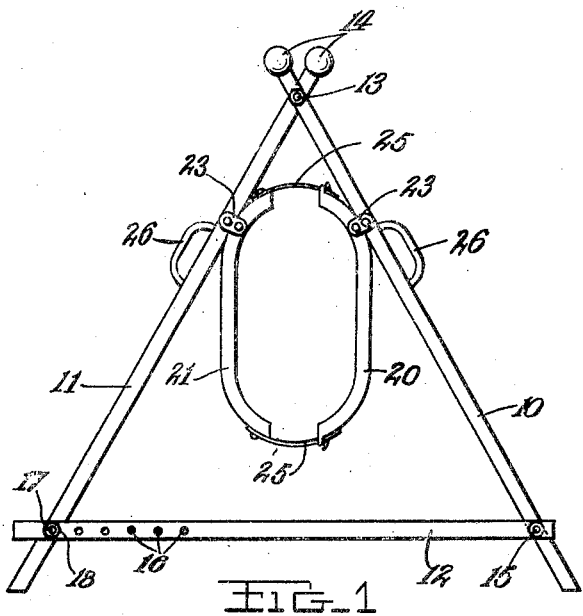
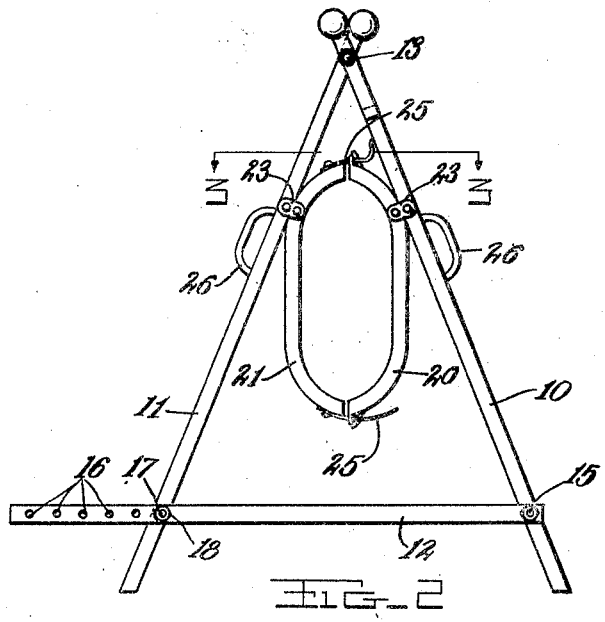
INVENTOR.
John Swityk
BY George C. Heinrich
ATTORNEY.

UNITED STATES PATENT OFFICE.

JOHN SWITYK, OF MEOTA, SASKATCHEWAN, CANADA.

CATTLE-YOKE.

1,346,278.     Specification of Letters Patent.     Patented July 13, 1920.

Application filed March 23, 1920. Serial No. 368,031.

*To all whom it may concern:*

Be it known that I, JOHN SWITYK, a citizen of Ukrania, residing at Meota, Province of Saskatchewan, and Dominion of Canada, have invented certain new and useful Improvements in Cattle-Yokes, of which the following is a specification.

This invention relates to a cattle yoke adapted to be worn by cattle, or other domestic animals, to prevent the latter from passing through rail fences.

The invention has for an object to provide a simple and inexpensive device of this kind which may be readily adjusted to fit animals of different sizes.

For further comprehension of the invention, and of the objects and advantages thereof, reference will be had to the following description and accompanying drawings, and to the appended claims in which the various novel features of the invention are more particularly set forth.

Figure 1 of the drawings is a face view of a cattle yoke constructed according to my invention, showing it expanded to fit upon a large animal.

Fig. 2 is a similar view showing the yoke contracted to fit upon a smaller animal.

Fig. 3 is a horizontal section on the line 3—3 of Fig. 2.

As here shown my improved yoke comprises a triangular frame comprising the two inclined side bars 10 and 11 and bottom horizontal bar 12. The side bars are hinged together as at 13 adjacent their upper ends which may have the spherical heads 14 mounted thereon. The horizontal bar 12 is hinged at one end as at 15 to the side bar 10 near the lower end of the latter and has a series of longitudinally spaced holes 16 formed therein toward its other end. This latter end of the horizontal bar is secured to the side bar 11 by means of a bolt 17 passing through a suitable opening in the side bar and through one of the holes 16 in the horizontal bar, and having a nut 18 screwed on its end.

Mounted within this frame is a collar of generally oblong shape with rounded ends adapted to encircle the neck of the animal this collar being divided vertically into two halves or elements 20 and 21 connected to the respective side bars 10 and 11. As here shown each collar element is connected near its upper end to its side bar by a pair of link-plates 23 which are pivotally connected at one end to the collar elements, and at opposite ends to the side bars. The link-plates 23 are of a length to cause the outer faces of the curved upper portions of the collar elements to lie in close adjacence to the inner faces of the side bars. The two halves or elements of the collar are secured together by the strap and buckle devices 25 carried on the split ends thereof. A pair of handles 26 may be mounted on the side bars for convenience in holding the yoke while it is being adjusted upon the animal.

It will be obvious that when the side bar 11 is adjusted to have the bolt 17 pass through different ones of the holes 16, the collar element 21 carried thereby will be moved toward or away from the collar element 20 carried by the side bar 10, thus expanding or contracting the collar, the strap and buckle fastening devices 25 permitting of the two halves being secured together in the different positions to which they may be adjusted.

Having thus described my invention what I claim as new and desire to secure by Letters Patent of the United States is—

1. A cattle yoke for the purpose specified comprising a triangular frame made up of a pair of side bars hinged together adjacent their upper ends, a horizontal bottom bar, means connecting said bottom bar to said side bars to hold the latter at different angles of inclination toward one another, a collar mounted in said frame and split vertically into two halves, a pair of link plates connecting each collar half with a side bar, said link plates being each pivotally connected at one end to a collar half and at opposite ends to a side bar, and means for attaching the collar halves together when moved with the said side bars to expand or contract the collar.

2. A cattle yoke for the purpose specified comprising a triangular frame made up of a pair of side bars hinged together adjacent their upper ends, a horizontal bar hinged at one end to one of said side bars near the lower end thereof, and having a series of longitudinally spaced holes in its opposite end, a bolt adapted to pass through any one of said holes to secure the last mentioned end of the bottom bar to the other side bar, an oblong collar split vertically into two halves, mounted in the said frame, a pair of link-plates connecting each collar half toward its upper end with a side-bar, the outer faces of the collar halves and the inner faces of side bars being in close adjacence at the points where the link-plates connect thereto, and strap and buckle devices for connecting the split ends of the collar together.

In testimony whereof I have affixed my signature.

JOHN SWITYK.